United States Patent [19]
Free et al.

[11] Patent Number: 5,474,041
[45] Date of Patent: Dec. 12, 1995

[54] ENGINE LUBRICATION SYSTEM WITH DECREASED POWER DRAW

[75] Inventors: P. Doug Free; Thomas L. McKinley, both of Columbus, Ind.

[73] Assignee: Cummins Engine Company, Inc., Columbus, Ind.

[21] Appl. No.: 365,022

[22] Filed: Dec. 28, 1994

[51] Int. Cl.⁶ .................................................. F01M 1/16
[52] U.S. Cl. ................................... 123/196 CP; 184/6.5
[58] Field of Search ...................... 123/196 R, 196 CP; 184/6.5

[56] References Cited

U.S. PATENT DOCUMENTS

| | | | |
|---|---|---|---|
| 3,810,714 | 5/1974 | Turner | 417/80 |
| 4,067,665 | 6/1975 | Schwartzman | 417/245 |
| 4,309,152 | 1/1982 | Hagen | 417/218 |
| 4,448,024 | 5/1984 | Molini et al. | 60/649 |
| 4,714,402 | 12/1987 | Ichikawa | 415/35 |
| 4,843,822 | 7/1989 | Okada | 60/614 |
| 5,375,419 | 12/1994 | Wright et al. | 60/607 |

*Primary Examiner*—Henry C. Yuen
*Assistant Examiner*—Erick Solis
*Attorney, Agent, or Firm*—Woodard, Emhardt, Naughton, Moriarty & McNett

[57] ABSTRACT

The present invention provides for automatic relief of excess pressure within an engine lubrication system in such a way as to recover a significant portion of the energy that was used to create the excess oil pressure. A pressure regulator creates a directed flow of oil in order to relieve pressure within the lubrication system. This directed flow of oil is caused to impact an impulse/momentum wheel, thereby imparting momentum from the oil to the wheel, creating a torque therein. The impulse/momentum wheel is advantageously coupled to the engine gear train, thereby reducing the engine power required to run the gear train by recovering energy from the lubrication system.

22 Claims, 4 Drawing Sheets

ENGINE LUBRICATION SYSTEM WITH DECREASED POWER DRAW

TECHNICAL FIELD OF THE INVENTION

The present invention relates generally to engine lubrication systems, and more particularly to engine lubrication systems having decreased power draw.

BACKGROUND OF THE INVENTION

Referring to FIG. 1, a prior art engine and lubrication system is schematically illustrated and indicated generally at 10. The engine 10 includes a covered camshaft compartment (head cavity) 12, a crankcase 14, and an oil pan 16. The oil pan 16 collects the excess oil used to lubricate the moving parts of the engine 10. Power is generated by the engine 10 and used to rotate a crankshaft gear 18. Rotation of the crankshaft gear 18 is transmitted through a gear train 20 which is coupled to a camshaft gear 22, causing the rotation of the camshaft(s) (not shown) which control fuel injection and valve operation.

The lubrication system is driven by an oil pump 24 within the oil pan 16. The oil pump 24 is driven by the crankshaft gear 18 through an oil pump gear 26. Oil pump 24 suctions oil from the bottom of oil pan 16 through an inlet conduit 28 and expels pressurized oil through oil outlet 30. Oil pump 24 includes a primary oil pressure regulator (not shown) which maintains the oil pressure at outlet 30 under a predetermined maximum pressure limit. The primary oil pressure regulator is normally active only at cold engine startup, when the oil exhibits increased viscosity.

The oil in outlet 30 passes through an oil filter/oil cooler 32. The filtered/cooled oil is then supplied to a main crankshaft bearing 34 and a camshaft bearing 36 for lubrication thereof. Because the oil pump 24 is driven directly off of the crankshaft gear 18, the speed of the oil pump 24 varies directly with engine speed. Consequently, the pressure of the oil at outlet 30 also varies directly with engine speed. Since the oil pressure within the engine 10 lubrication system is not constant, a secondary oil pressure regulator 38 is included. If the pressure at secondary regulator 38 exceeds a predetermined pressure limit, excess oil is dumped back to the oil pan 16 through oil flow path 40.

The prior art oil pressure regulation system of FIG. 1 exhibits a major disadvantage: the energy used to create the excess pressure in the oil is completely wasted when the oil is dumped back into the oil pan 16. With ever-increasing pressures to improve the fuel efficiency of engines, such a waste of engine energy has become unacceptable.

Proposed solutions to this problem in the prior art have generally involved the use of a variable rate oil pump, a pressure sensor "on top" of the engine, and a feedback path control system to constantly vary the oil pump operational speed and hence the oil pressure. Although this solution theoretically reduces the power consumption of the engine lubrication system, it is still undesirable due to its complexity, increased cost, and increased maintenance burden.

There is therefore a need in the prior art for an engine lubrication system which minimizes the power required to drive the system, yet which is simple and inexpensive to implement and maintain. The present invention is directed toward meeting these needs.

SUMMARY OF THE INVENTION

The present invention provides for automatic relief of excess pressure within an engine lubrication system in such a way as to recover a significant portion of the energy that was used to create the excess oil pressure. A pressure regulator creates a directed flow of oil in order to relieve pressure within the lubrication system. This directed flow of oil is caused to impact an impulse/momentum wheel, thereby imparting momentum from the oil to the wheel, creating a torque therein. The impulse/momentum wheel is advantageously coupled to the engine gear train, thereby reducing the engine power required to run the gear train by recovering energy from the lubrication system.

In one form of the invention an engine lubrication system is disclosed, comprising a reservoir adapted for holding a quantity of lubricant; a pump operative to transmit the lubricant to at least one remote location within the engine for lubrication thereof; a pressure regulator in fluid communication with the lubricant and operative to discharge a portion of the quantity of lubricant in a directed flow if a pressure of the lubricant exceeds a predetermined threshold; and an impulse/momentum wheel located in a path of the directed flow, such that a momentum of the directed flow is at least partially transferred to the impulse/momentum wheel.

In another form of the invention a device for recovering wasted energy from a lubricant within an engine lubrication system is disclosed, comprising a pressure regulator in fluid communication with the lubricant and operative to discharge a portion of the lubricant in a directed flow if a pressure of the lubricant exceeds a predetermined threshold; and an impulse/momentum wheel adapted to rotate when in contact with the directed flow.

In another form of the invention a method of recovering wasted energy from an engine lubrication system, comprising the steps of (a) sensing a pressure of a quantity of lubricant; (b) discharging a portion of the lubricant in a directed flow if the pressure exceeds a predetermined threshold; and (c) aiming the directed flow such that it contacts an impulse/momentum wheel, whereby a momentum of the directed flow is at least partially transferred to the impulse/momentum wheel.

DESCRIPTION OF THE PREFERRED EMBODIMENT

Figure 1:
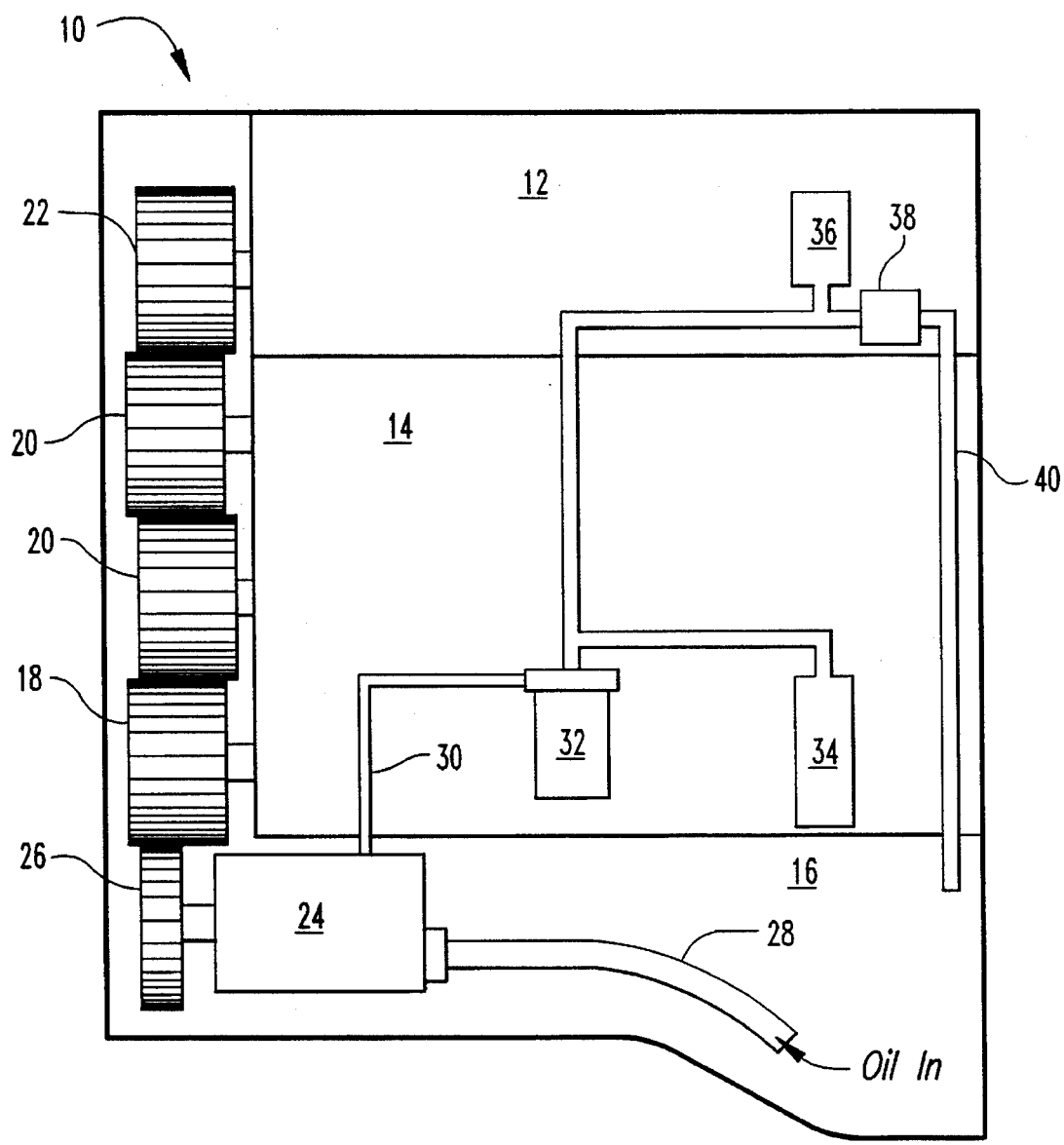
FIG. 1 is a schematic diagram of a prior art engine and lubrication system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
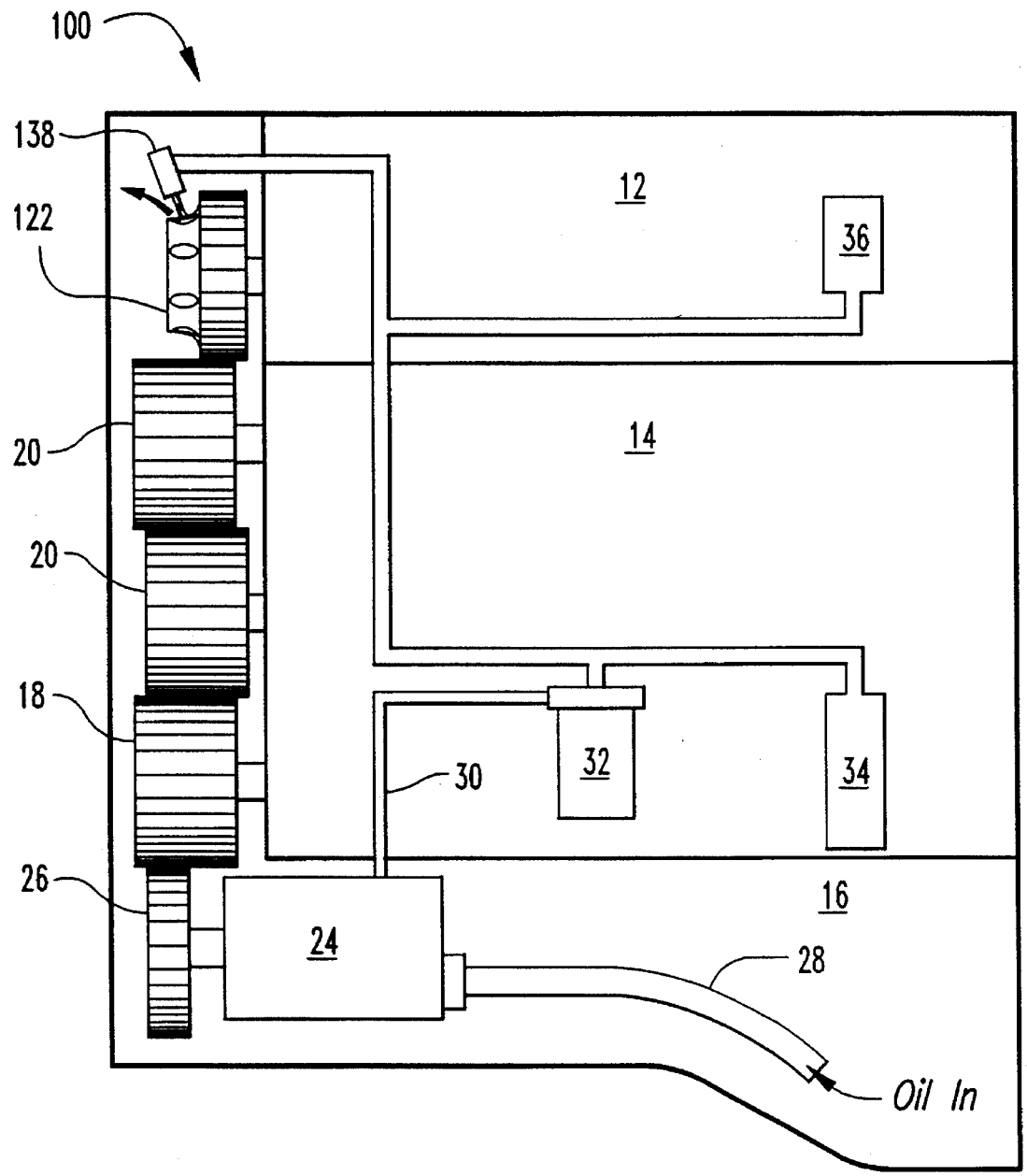
FIG. 2 is a schematic diagram of an engine and lubrication system of the present invention.

Referring to FIG. 2, an engine incorporating a lubrication system according to the present invention is schematically illustrated and indicated generally at 100. As in the prior art engine 10, the engine 100 includes a covered camshaft compartment (head cavity) 12, a crankcase 14, and an oil pan 16. The oil pan 16 collects the excess oil used to lubricate the moving parts of the engine 10. Power is generated by the engine 100 and used to rotate a crankshaft gear 18. Rotation of the crankshaft gear 18 is transmitted through a gear train 20 which is coupled to a camshaft gear 122, causing the rotation of the camshaft(s) (not shown) which control fuel injection and valve operation.

The lubrication system is driven by an oil pump 24 within the oil pan 16. The oil pump 24 is driven by the crankshaft gear 18 through an oil pump gear 26. Oil pump 24 suctions oil from the bottom of oil pan 16 through an inlet conduit 28 and expels pressurized oil through oil outlet 30. Oil pump 24 includes a primary oil pressure regulator (not shown) which maintains the oil pressure at outlet 30 under a predetermined maximum pressure limit. The primary oil pressure regulator is normally active only at cold engine startup, when the oil exhibits increased viscosity.

The oil in outlet 30 passes through an oil filter/oil cooler 32. The filtered/cooled oil is then supplied to a main crankshaft bearing 34 and a camshaft bearing 36 for lubrication thereof. Because the oil pump 24 is driven directly off of the crankshaft gear 18, the speed of the oil pump 24 varies directly with engine speed. Consequently, the pressure of the oil at outlet 30 also varies directly with engine speed. Since the oil pressure within the engine 100 lubrication system is not constant, a secondary oil pressure regulator 138 is included.

Unlike the prior art engine lubrication system of FIG. 1, when secondary pressure regulator 138 drains oil to relieve excess pressure in the lubrication system, it does not simply drain such oil back to the oil pan 16. Rather, the secondary pressure regulator 138 expels the oil in a directed flow which impacts an impulse/momentum wheel, commonly known as a "Pelton" wheel. The Pelton wheel includes a series of concave depressions spaced around its circumference which are impacted by the directed oil flow from the secondary pressure regulator 138. The force of the impact causes the Pelton wheel to rotate. The Pelton wheel may be a separate wheel intermeshed with the engine gear train, or, as illustrated in FIG. 2, it may be formed as a portion of one of the existing gears in the engine 100 gear train. Preferably, the Pelton wheel is incorporated into the cam gear 122 which drives the valve camshaft. This is because the cam gear 122 of the valve camshaft does not need a full tooth width since torque draw for the valve-side camshaft is only a small fraction of the torque draw for the injector-side camshaft. It will be appreciated by those skilled in the art after the detailed disclosure hereinbelow, however, that the location of the Pelton wheel is a mere design choice, in that the present invention comprehends the use of a separate wheel, or the incorporation of Pelton wheel with any existing engine gear or shaft.

The use of a Pelton wheel in the engine lubrication system as illustrated in FIG. 2 causes a portion of the energy normally lost due to the excess pressurization of the lubrication oil to be recovered by inputting a portion of the energy back into the engine gear train. Then the cam gear 122 is subjected to a directed oil spray from the secondary pressure regulator 138, thereby causing rotation of the cam gear 122, less energy is required from the engine crankshaft gear 18 to drive the cam gear 122. The arrangement of the secondary pressure regulator 138 and the cam gear 122 incorporating a Pelton wheel therefore reduces the total power draw of the lubrication system of the engine 100. Reducing the power draw of the engine lubrication system directly increases the fuel economy of the engine 100. After the oil from the secondary pressure regulator 138 has impinged the cam gear 122, it simply falls away and drains back into the oil pan 16. The camshaft gear 122 receives the spray of surplus oil exiting the secondary pressure regulator 138 and converts the momentum energy of the oil back into shaft torque. This acts to lower the net power needed to drive the lubrication system.

Figure 3:
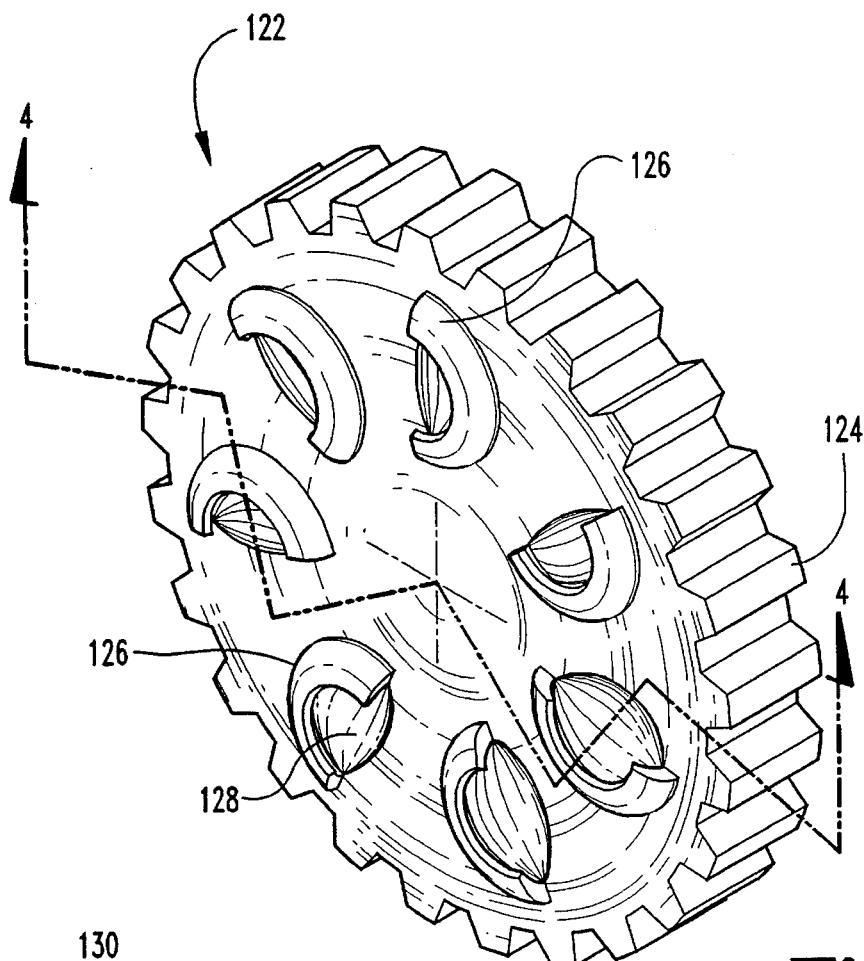
FIG. 3 is a perspective view of a first embodiment energy recovery gear of the present invention.
Figure 4:
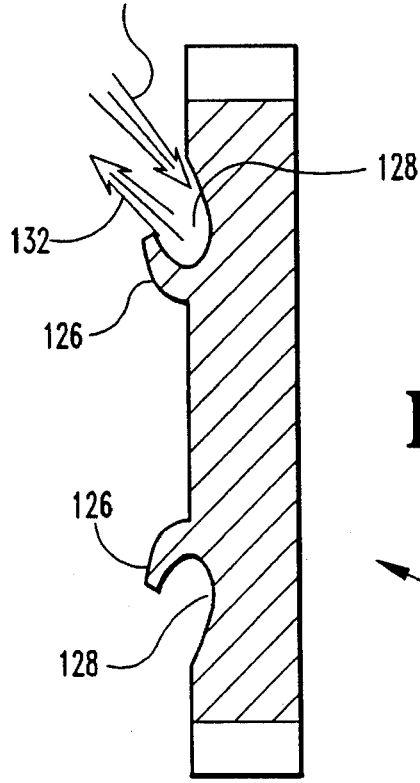
FIG. 4 is a cross-sectional illustration of the energy recovery gear of FIG. 3.

Referring now to FIG. 3, there is illustrated a preferred embodiment of the camshaft gear 122 incorporating a Pelton wheel. The camshaft wheel 122 includes a series of gear teeth 124 arranged symmetrically around the circumference thereof. The gear teeth 124 intermesh with like gear teeth of the gear train 20 in order to couple the camshaft gear 122 to the crankshaft gear 18. In order to recover the momentum energy of the oil exiting the secondary pressure regulator 128, the camshaft gear 122 includes a plurality of concave "buckets" 126 equally spaced on a side surface of the cam gear 122 at a radius which is less than the full radius of the camshaft gear 122. Each of the buckets 126 include a concave depression 128 which receive an oil inflow stream 130 from the secondary pressure regulator 138, and produce an oil outflow stream 132 (see FIG. 4). The impact of the oil stream 130 with the concave surface 128 transfers momentum from the oil stream to the camshaft gear 122, thereby providing torque to rotate the cam shaft gear 122. It is preferable that the incoming oil stream 130 contact the concave surface 128 in a line that is parallel to a tangent to the camshaft gear 122. In this configuration, maximum momentum energy of the incoming oil stream 130 is translated into rotational torque.

Figure 5:
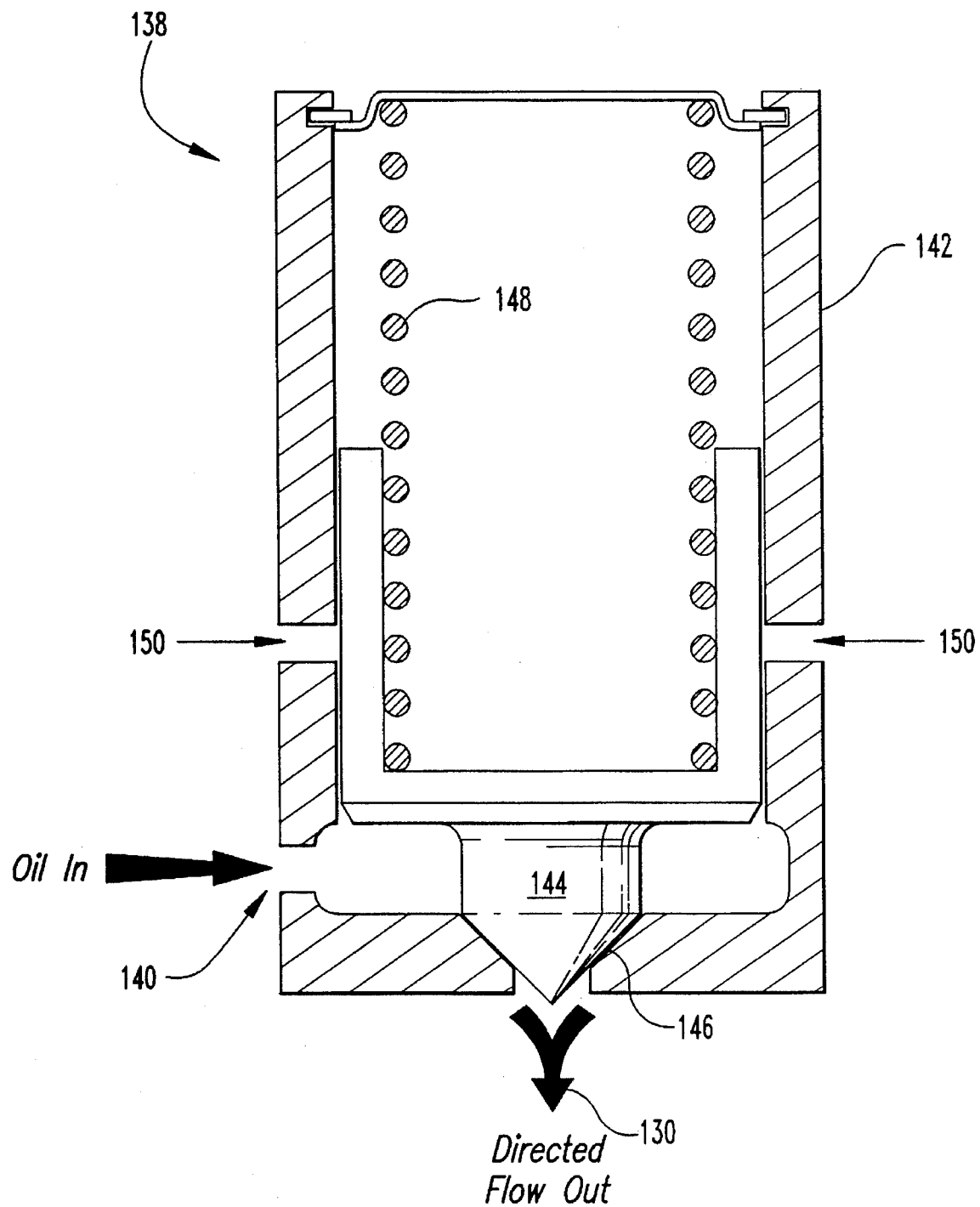
FIG. 5 is a cross-sectional illustration of a first embodiment oil pressure regulator of the present invention.

Referring now to FIG. 5, a preferred embodiment of the secondary pressure regulator 138 is illustrated in cross-section. The secondary pressure regulator 138 includes an oil inlet port 140 formed within a housing 142 thereof. The oil inlet port 140 is coupled to the oil flow path of the engine lubrication system, therefore the pressure within the engine lubrication system is constantly applied to the secondary pressure regulator 138. A valve member 144 is biased against a valve seat 146 by means of a biasing member 148, such as a spring. The biasing force produced by the spring 148 is selected so that the valve 144 remains seated against the valve seat 146 during periods of normal pressure within the engine lubrication system. When the pressure in the engine lubrication system exceeds a predetermined threshold established by the spring 148, this pressure is great enough to partially overcome the force of the spring 148, and therefore causes the valve 144 to be retracted back into the body of the secondary pressure regulator 138. Such movement causes the valve 144 to become unseated from the valve seat 146. The unseating of the valve 144 causes the directed outflow of oil 130 which is aimed at the concave cavity 128 of one of the buckets 126 of the camshaft gear 122. The greater the pressure within the lubrication system, the more the valve 144 is deflected into the cavity of the secondary pressure regulator 138, and consequently the greater is the outflow of oil 130. The greater the outflow of oil 130, the greater the amount of momentum transferred to the camshaft gear 122. The secondary pressure regulator 138 further includes auxiliary safety dump holes 150 through the body 142 thereof. If the oil pressure of the lubrication system is great enough to deflect the valve 144 past the safety openings 150, oil will flow out of the safety openings 150, thereby further relieving the pressure in the lubrication system. Oil exiting the safety openings 150 does not contribute to a transfer of momentum to the camshaft gear 122. Once pressure in the lubrication system has been lowered a sufficient amount, the bias spring 148 once again pushes the valve 144 into a seating relationship with valve seat 146.

It will be appreciated by those skilled in the art that the energy recovery system of the present invention represents a significant improvement over the variable speed oil pump/feedback loop of the prior art system. The present invention provides for automatic relief of excess pressure within the engine lubrication system, however it does so in such a way as to recover a significant portion of the energy that was used to create the excess oil pressure. The incorporation of a Pelton wheel within an engine in conjunction with the secondary pressure regulator does not represent a significant increase in the cost of the engine, and further does not represent a significantly increased maintenance burden.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An engine lubrication system, comprising:

a reservoir adapted for holding a quantity of lubricant;

a pump operative to transmit the lubricant to at least one remote location within the engine for lubrication thereof;

a pressure regulator in fluid communication with the lubricant and operative to discharge a portion of the quantity of lubricant in a directed flow if a pressure of the lubricant exceeds a predetermined threshold; and an impulse/momentum wheel located in a path of the directed flow, such that a momentum of the directed flow is at least partially transferred to the impulse/momentum wheel.

2. The engine lubrication system of claim 1, wherein the transferal of momentum to the impulse/momentum wheel creates a torque therein.

3. The engine lubrication system of claim 1, wherein the at least one remote location includes a camshaft bearing.

4. The engine lubrication system of claim 1, wherein the impulse/momentum wheel comprises:

a wheel mounted to a shaft for rotation; and a plurality of concave members formed on a surface of the wheel such that the concave members sequentially enter the path of the directed flow as the wheel rotates.

5. The engine lubrication system of claim 4, wherein the wheel comprises a gear having a plurality of teeth positioned equicircumferentially thereon.

6. The engine lubrication system of claim 1, wherein the impulse/momentum wheel comprises:

a wheel mounted to a shaft for rotation; and a plurality of concave depressions formed at least partially in a surface of the wheel such that the concave depressions sequentially enter the path of the directed flow as the wheel rotates.

7. The engine lubrication system of claim 6, wherein the wheel comprises a gear having a plurality of teeth positioned equicircumferentially thereon.

8. The engine lubrication system of claim 1, wherein the path of the directed flow is substantially perpendicular to a radius of the impulse/momentum wheel intersecting a point of contact between the directed flow and a surface of the impulse/momentum wheel.

9. The engine lubrication system of claim 1, wherein the impulse/momentum wheel is a camshaft gear.

10. A device for recovering wasted energy from a lubricant within an engine lubrication system, comprising:

a pressure regulator in fluid communication with the lubricant and operative to discharge a portion of the lubricant in a directed flow if a pressure of the lubricant exceeds a predetermined threshold; and an impulse/momentum wheel adapted to rotate when in contact with the directed flow.

11. The device of claim 10, wherein the impulse/momentum wheel rotates in response to a transferal of momentum from the directed flow to the impulse/momentum wheel.

12. The engine lubrication system of claim 10, wherein the impulse/momentum wheel comprises:

a wheel mounted to a shaft for rotation; and a plurality of concave members formed on a surface of the wheel such that the concave members sequentially enter the path of the directed flow as the wheel rotates.

13. The engine lubrication system of claim 12, wherein the wheel comprises a gear having a plurality of teeth positioned equicircumferentially thereon.

14. The engine lubrication system of claim 10, wherein the impulse/momentum wheel comprises:

a wheel mounted to a shaft for rotation; and a plurality of concave depressions formed at least partially in a surface of the wheel such that the concave depressions sequentially enter the path of the directed flow as the wheel rotates.

15. The engine lubrication system of claim 14, wherein the wheel comprises a gear having a plurality of teeth positioned equicircumferentially thereon.

16. The engine lubrication system of claim 10, wherein the path of the directed flow is substantially perpendicular to a radius of the impulse/momentum wheel intersecting a point of contact between the directed flow and a surface of the impulse/momentum wheel.

17. The engine lubrication system of claim 10, wherein the impulse/movement wheel is a camshaft gear.

18. A method of recovering wasted energy from an engine lubrication system, comprising the steps of:

(a) sensing a pressure of a quantity of lubricant;

(b) discharging a portion of the lubricant in a directed flow if the pressure exceeds a predetermined threshold; and (c) aiming the directed flow such that it contacts an impulse/momentum wheel, whereby a momentum of the directed flow is at least partially transferred to the impulse/momentum wheel.

19. The method of claim 18, wherein step (c) creates a torque in the impulse/momentum wheel.

20. The method of claim 18, wherein step (c) further comprises the step of:

(c.1) aiming the directed flow such that it contacts a plurality of concave members formed on a surface of the impulse/momentum wheel, whereby the concave members sequentially enter a path of the directed flow as the impulse/momentum wheel rotates.

21. The method of claim 18, wherein step (c) further comprises the step of:

(c.1) aiming the directed flow such that it contacts a plurality of concave depressions formed at least partially in a surface of the impulse/momentum wheel, whereby the concave depressions sequentially enter a path of the directed flow as the impulse/momentum wheel rotates.

22. The method of claim 18, wherein step (c) further comprises the step of:

(c.1) aiming the directed flow such that a path of the directed flow is substantially perpendicular to a radius of the impulse/momentum wheel intersecting a point of contact between the directed flow and a surface of the impulse/momentum wheel.

* * * * *

UNITED STATES PATENT AND TRADEMARK OFFICE
CERTIFICATE OF CORRECTION

PATENT NO. : 5,474,041
DATED : December 12, 1995
INVENTOR(S) : P. Doug Free and Thomas L. McKinley It is certified that error appears in the above-identified patent and that said Letters Patent is hereby corrected as shown below:

In column 3, line 62, replace "Then" with --When--.

Signed and Sealed this

Nineteenth Day of March, 1996

Attest:

BRUCE LEHMAN

*Attesting Officer*     *Commissioner of Patents and Trademarks*